3,185,548
PROCESS OF MAKING RADON FLUORIDE AND OF SEPARATING RARE GASES FROM EACH OTHER
Paul R. Fields and Moshe H. Zirin, Chicago, and Lawrence Stein, Downers Grove, Ill., assignors to the United States of America as represented by the United States Atomic Energy Commission
No Drawing. Filed Oct. 5, 1962, Ser. No. 228,777
4 Claims. (Cl. 23—205)

This invention deals with a process of making radon fluoride and also with a process of separating rare gases from each other.

It was found that radon, although it is one of the rare gases that have been distinguished all the time by their lack of reactability, does react with fluorine gas at elevated temperature. The process of this invention is based on this finding.

This process thus comprises mixing radon gas with fluorine, heating the mixture to a temperature of between 400 and 500° C. at a fluorine pressure of between 300 and 800 mm. Hg whereby radon fluoride is formed, and cooling whereby the radon fluoride condenses.

Radon fluoride was found to be very stable at room temperature. It starts to volatilize at about 250° C. and a pressure of $10^{-5}$ mm. Hg.

Radon fluoride is useful for the topical treatment of cancer cells and other malignancies.

The invention can also be applied to the separation of a mixture of rare gases as it occurs, for instance, in the atmosphere. By heating the gas mixture (after removal of oxygen, nitrogen, water and carbon dioxide by means known to those skilled in the art), the remaining mixture of noble gases is fluorinated according to the process of this invention. Xenon fluoride and radon fluoride are formed, while krypton, helium, neon and argon remain unreacted and in gaseous form. The mass is then cooled to about −78° C., and the krypton, helium, neon and argon are pumped off. Thereafter the mixture of xenon and radon fluorides is heated to approximately 50° C. under vacuum, whereby the xenon fluoride is volatilized, while solid radon fluoride remains as a residue.

In the following, two examples are given for illustrative purposes.

*Example I*

Radon-222 (5.1 microcuries) was condensed in a nickel container at −195° C. Fluorine was added to a pressure of 300 mm. Hg. The mixture was heated to about 400° C. for 30 minutes, and the vessel was then cooled to −78° C. Excess fluorine was pumped off and passed through a trap cooled to −195° C. to condense any unreacted radon. No radon was found in the trap.

A vacuum was maintained at a level of $3.2 \times 10^{-6}$ mm. Hg and the reaction vessel was heated successively to −78° C. (in a bath of Dry Ice); −25° C. ($CCl_4$); 0° C. (ice); 30° C. ($H_2O$); 80° C. ($H_2O$); 150° C. (electrically heated); and 250° C. (electrically heated). No radon volatilized until the temperature of 250° C. was reached.

From this behavior of the radon it is obvious that a radon fluoride of low volatility had been formed. A control test in which radon was heated in the nickel container at 400° C. without fluorine showed no reaction of the radon. The position and quantity of radon in this test was determined indirectly by gamma-counting its daughter $Bi^{214}$.

*Example II*

Xenon gas was introduced into a nickel container at a pressure of 110 mm. Hg at room temperature. The vessel was then cooled to −195° C., and 87 microcuries of radon were condensed into the vessel. The vessel was warmed to about 150° C., and fluorine was added to a pressure of 795 mm. Hg. The mixture was then heated to 400° C., for about 25 minutes, and then cooled to −78° C. The excessive fluorine was pumped off and passed through a trap cooled to −195° C. Thereafter the vessel was heated to 50° C. whereby the xenon fluoride sublimed into the trap. No radon activity could be determined in the trap at this point.

Then the vessel was heated gradually to 250° C., and a pressure of $9.0 \times 10^{-6}$ mm. Hg was established. The radon was observed to leave the reaction vessel and to condense in the line to the trap before reaching the latter. It is clear that this radon must have been in the form of radon fluoride on account of its low volatility.

It will be understood that the invention is not to be limited to the details given herein but that it may be modified within the scope of the appended claims.

What is claimed is:

1. A process of preparing radon fluoride, consisting of admixing fluorine gas of a pressure between 300 and 800 mm. Hg to radon, heating the gas mixture obtained to from 400 to 500° C. whereby radon fluoride is formed, and separating the radon fluoride from unreacted fluorine gas.

2. The process of claim 1 wherein the gas mixture is heated to about 400° C.

3. A process of separating noble gases from each other, consisting of heating a mixture of argon, krypton, helium, xenon and radon with fluorine of between 300 and 800 mm. Hg to between 400 and 500° C., whereby solid xenon fluoride and radon fluoride are formed, while krypton and argon remain unreacted and in gaseous form; cooling the mixture; pumping said unreacted gases including fluorine off from the fluorides; and fractionally volatilizing xenon fluoride by heating to about 50° C. under vacuum, whereby solid radon fluoride remains as a residue.

4. As a new compound, radon fluoride.

References Cited by the Examiner

Cook: "Argon, Helium and the Rare Gases," copyrighted October 5, 1961, page 159, vol. 1.

Mellor: "Comprehensive Treatise on Inorganic and Theoretical Chemistry," Supp-II, part 1 (1956), page 65.

MAURICE A. BRINDISI, *Primary Examiner.*